UNITED STATES PATENT OFFICE.

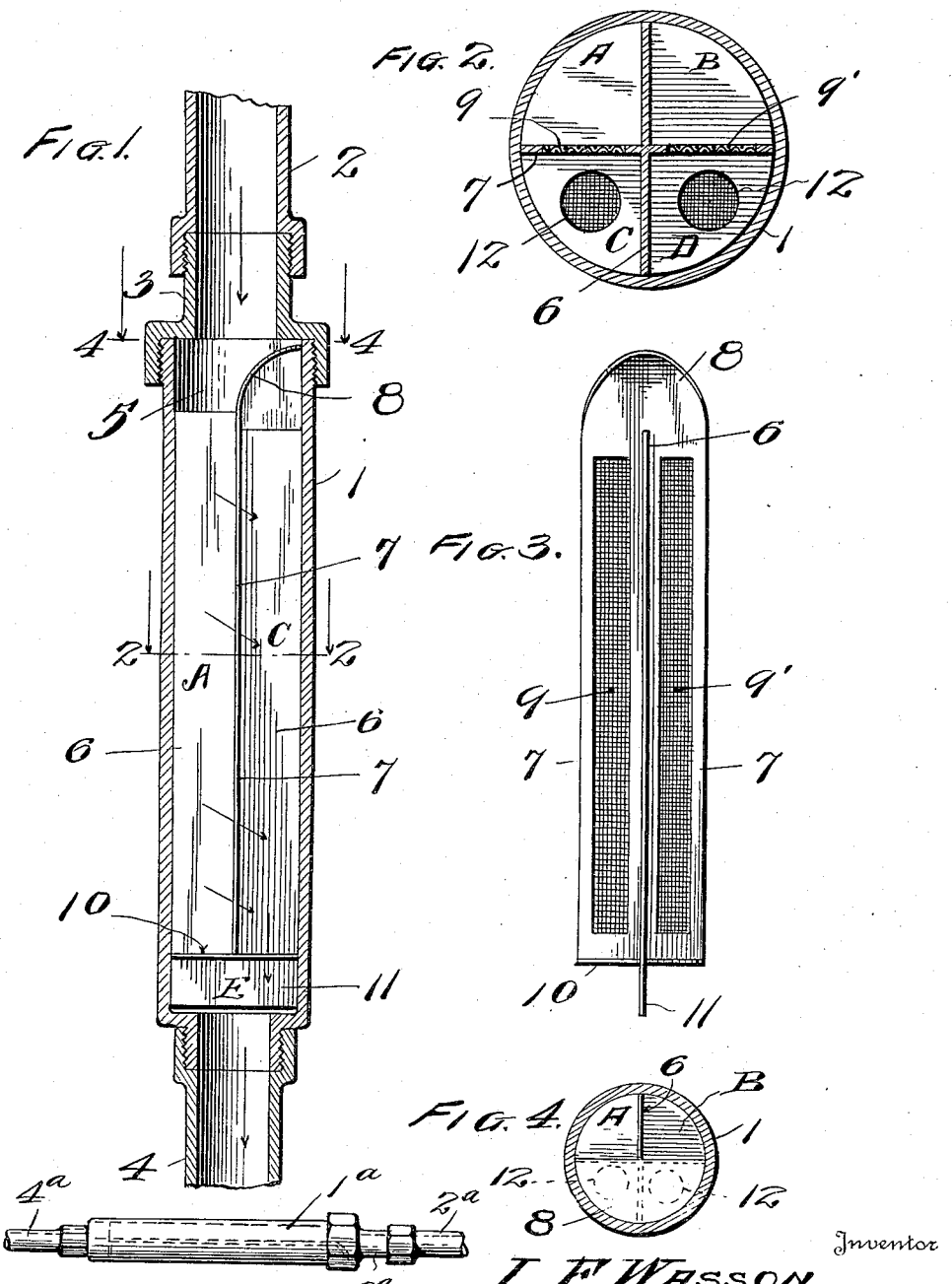

LOUIS FRANKS WASSON, OF ELLENSBURG, WASHINGTON.

FILTER.

1,174,784.   Specification of Letters Patent.   Patented Mar. 7, 1916.

Application filed June 19, 1915. Serial No. 35,011.

*To all whom it may concern:*

Be it known that I, LOUIS F. WASSON, a citizen of the United States of America, residing at Ellensburg, in the county of Kittitas and State of Washington, have invented certain new and useful Improvements in Filters, of which the following is a specification.

The present invention relates to an improved filter of the screen type, especially designed for use in connection with the carbureter of an internal combustion engine for filtering the gasolene to clear it of dirt and other extraneous matter.

The primary object of the invention is the provision of a device which is comparatively inexpensive in cost, but simple in construction, and durable for filtering the fuel in the supply pipe as it is led to the carbureter.

The invention consists essentially in certain novel combinations and arrangements of parts in connection with the fuel supply pipe, as will be hereinafter more fully pointed out and claimed.

In the accompanying drawings I have illustrated one complete example, showing the device in two positions, of the physical embodiment of my invention constructed according to the best mode I have so far devised for the practical application of the principles of my invention, and which has so far proven highly satisfactory in actual use.

Figure 1 is a transverse sectional view of a fuel or gasolene pipe, disclosing the filter of my invention therein. Fig. 2 is an enlarged view on line 2 2 of Fig. 1. Fig. 3 is a view of the filtering device detached. Fig. 4 is a sectional view on line 4—4 of Fig. 1. Fig. 5 shows the invention in horizontal position.

In Fig. 1 I have illustrated the removable device as employed in connection with a casing 1 which may be of brass pipe or other suitable material with a smooth bore and of proper size, and this casing is connected to the gasolene pipe 2 through the medium of a coupling 3 at one end, and at the other end the section 4 of the supply pipe is threaded on the casing. This casing forms a cylindrical chamber 5 in which the device is inclosed, and the walls of the chamber are bored to form smooth surfaces to permit a close and neat fit of the filtering device.

The filtering device comprises essentially two plates 6 and 7, of thin sheet metal, arranged at right angles to each other, in cruciform of just sufficient diameter to permit insertion into the pipe, and the upper end of the plate 7 is extended and turned over as at 8. The plates are of a size to fit closely and neatly within the bored cylinder 5 and the turned end 8 has a periphery or edge to closely fit one half of the cylindrical bore, as seen clearly in Fig. 4. These plates, when placed in the chamber, form partitions which provide four compartments within the cylinder, as A, B, C, D, which are separated from each other, except for the two screen portions 9 9' in the plate or partition 7. These screens are filtering walls between the respective compartments A—C and B—D.

A metallic, circular disk 10 forms the bottom to the compartments A B C D, and this disk, which is integral with the compartment plates or partitions, fits tightly in the bore of the cylinder 5, and is supported above the outlet of the cylinder by means of the extension 11 of the plate 6. This extension forms the support for the filtering device when it is placed in horizontal position, and provides a space or chamber E for the filtered liquid after it has passed through the two screened openings 12, 12 in the bottom disk 10.

In Fig. 5 the filtering device is illustrated in horizontal position and the casing $1^a$ is shown connected to the supply pipe $2^a$ by the coupling $3^a$, and the section $4^a$ of the supply pipe is attached to the casing at its end opposite the coupling.

In either vertical or horizontal position, the filtering device provides the four compartments, and the curved extension 8 forms a closed front end for the two compartments C, D, and diverts the flow of the gasolene to the compartments A, B, as indicated by the arrows in Fig. 1. The liquid passes through the wire screens 9 and 9' to the compartments C, D, and from thence through the screens 12, 12 into the compartment or space E from whence it passes through the supply pipe to the carbureter. The filtering screens 9, 9' and 12, 12 are of exceeding fine gage to prevent the passage of extraneous matter, and they are effectual in performing their functions. When in horizontal position, gasolene entering the filtering device from the pipe 2ª, must pass through the horizontally positioned screens, and then through the smaller vertically disposed screens, thereby eliminating all dirt, and should water and air be contained in the liquid, they will be retained in the two compartments A B.

From the above description taken in connection with my drawings it is evident that the filtering device and its casing may be attached to or detached from the supply pipe of an engine, with facility and despatch, and the filtering device may be displaced or withdrawn for cleaning or repair with little labor or expenditure of time.

What I claim is:—

1. The combination with a cylindrical casing of a filtering device therein comprising plates in cruciform formed with a tight joint with the wall of the casing providing four compartments and the end of one of said plates being turned to form a closure for one end of two of said compartments and filtering screens in said plate, a disk closing the other end of said compartments having filtering screens in the closed compartments.

2. A filtering device comprising a casing, inclosing a pair of plates fixed together at right angles to each other and forming tight joints with the casing, one of said plates having screen portions at the sides of the other plate and formed with a turned extended end projecting over the other plate at one side.

3. A filtering device comprising a casing, inclosing a pair of angularly disposed plates forming tight joints with casing and one of which is formed with a turned and extended end projecting over one side of the other plate, and screen portions in the first mentioned plate at the sides of the second plate, said turned end forming a pair of closed compartments, a disk attached at the other end of the plates provided with screen portions to the closed compartments, and an extension to one of said plates beyond said disk.

In testimony whereof I affix my signature.

LOUIS FRANKS WASSON.

Copies of this patent may be obtained for five cents each, by addressing the "Commissioner of Patents, Washington, D. C."